United States Patent [19]

Hansen

[11] 4,289,339
[45] Sep. 15, 1981

[54] FITTING WITH TANGENTIAL LOCKING ROD FOR COUPLING PIPES

[75] Inventor: Arne H. Hansen, Doylestown, Pa.

[73] Assignee: Meyertech Incorporated, Lakewood, Colo.

[21] Appl. No.: 98,067

[22] Filed: Nov. 28, 1979

[51] Int. Cl.³ .............................................. F16L 21/08
[52] U.S. Cl. .................................. 285/305; 285/369; 285/382; 285/404; 403/378
[58] Field of Search .............. 285/404, 305, 382, 369; 151/26, 25 R; 403/378, 379

[56] References Cited

U.S. PATENT DOCUMENTS

| | | |
|---|---|---|
| 268,686 | 12/1882 | Kaiser . |
| 333,353 | 12/1885 | Smith . |
| 656,765 | 8/1900 | Copeland ........................... 285/404 |
| 839,947 | 1/1907 | McCluskey . |
| 971,794 | 10/1910 | Scott . |
| 3,282,609 | 11/1966 | Van Der Ham ................ 285/305 X |
| 3,822,074 | 7/1974 | Welcker .......................... 285/404 X |

FOREIGN PATENT DOCUMENTS

| | | |
|---|---|---|
| 1928233 | 12/1970 | Fed. Rep. of Germany ...... 285/404 |
| 1377087 | 9/1964 | France ................................ 285/404 |
| 19365 | of 1904 | United Kingdom ................ 285/404 |
| 26764 | of 1913 | United Kingdom ................ 285/404 |
| 875320 | 8/1961 | United Kingdom ................ 285/404 |

*Primary Examiner*—Thomas F. Callaghan
*Attorney, Agent, or Firm*—Fishburn, Gold and Litman

[57] ABSTRACT

A fitting for connection to a metal plain end pipe includes a generally cylindrical sleeve section sized to receive and cradle a pipe end portion, an annular seal in the sleeve section for forming a fluid-tight connection between the pipe end portion and the fitting and a locking rod extensible into the sleeve section. The locking rod is received into a bore extending substantially tangentially through a wall of the sleeve section and communicating with a sleeve section interior surface over less than a cross-sectional circular periphery of the bore whereupon a segment of the wall of the bore forms an intersection with the interior surface along the length of the bore. The locking rod has a metal cutting tip for tangentially cutting a groove along the intersection in a pipe end portion received in the sleeve section. The locking rod is securely retained in the groove as a key for firmly locking the pipe into the fitting.

9 Claims, 4 Drawing Figures

FITTING WITH TANGENTIAL LOCKING ROD FOR COUPLING PIPES

Pipe sections joined together to form a line or run of pipe for flow of fluids therethrough must be free from leakage and accordingly, considerable care must be employed in selecting a fitting which will properly form joints or couples between adjacent sections of pipe and which will securely grip and maintain the pipe in a straight, leakfree relationship. In order to reduce costs of installation, pipe connections should be accomplished as quickly and efficiently as possible. The use of plain end pipe facilitates such rapid installation twofold; first, time is not spent threading cut ends of pipe and second, the pipe ends need not be rotatably inserted into a threaded coupling. Where plain end pipe is used, joints usually may be more readily accomplished and couples, such as Tees, quickly positioned in a desired orientation for receiving a sprinkler head drop.

The principal objects of the present invention are: to provide a fitting for plain end pipe which easily and quickly connects adjacent pipe ends in end to end or confronting relation along a straight line; to provide such a fitting which effectively prevents longitudinal separation of the pipe relative to the fitting under high stress; to provide such a fitting having a seal for fluid-tight enagement with a plain end pipe and which includes an abutment member for limiting intrusion of the pipe; to provide such a fitting having a locking rod securing an end portion of the pipe therein; to provide such a fitting wherein the locking rod has a metal cutting edge for cutting a tangential groove in a wall of the pipe end for locking the pipe to the fitting; to provide such a fitting in which the locking rod extends tangentially through an interior surface of the fitting and acts as a key locking the pipe to the fitting; and to provide such a fitting for coupling pipes which is inexpensive to manufacture, simple to install, durable in use, and particularly well adapted for its proposed use.

Other objects and advantages of this invention will become apparent from the following description taken in connection with the accompanying drawings wherein are set forth, by way of illustration and example, certain embodiments of this invention.

Figure 1:
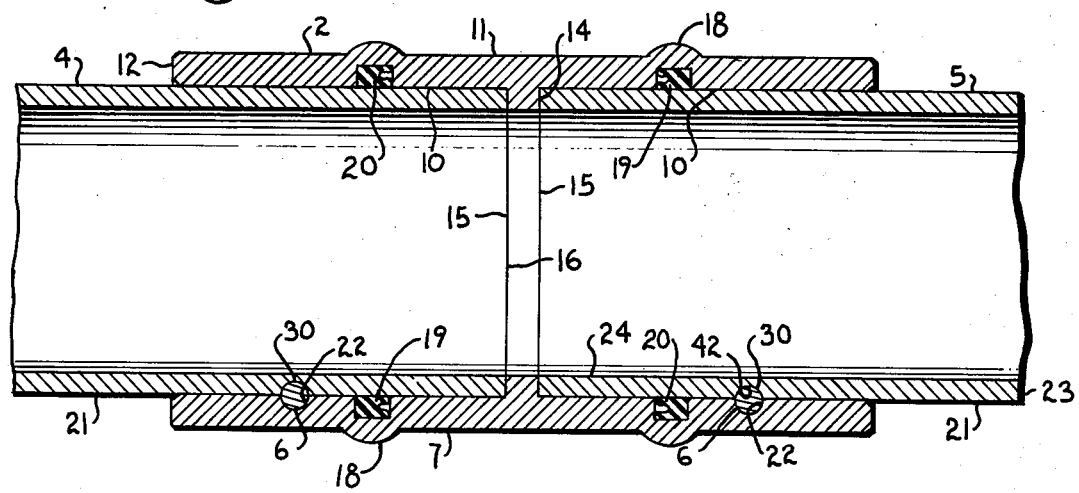
FIG. 1 is a longitudinal, cross-sectional view of a fitting for coupling pipes embodying the present invention and having confronting pipe end portions secured therein.

As required, detailed embodiments of the invention are disclosed herein; however, it is understood that the embodiments are merely exemplary of the invention which may be embodied in many forms that are different from the illustrative embodiments. Therefore, specific structural and functional details disclosed herein are not be be interpreted as limiting but merely as a basis for the claims defining the scope of this invention. In this regard, it is to be recognized that this invention may be embodied in many variations of pipe couplings or fittings, such as Tees, caps and the like, adapted for receiving an end portion of a plain end pipe and this disclosure is presented only as a representative basis for teaching one skilled in the art to variously employ the present invention in virtually any appropriately detailed structure.

Referring more in detail to the drawings:

The reference numeral 1 generally designates a fitting for coupling pipes embodying the present invention and having opposed sleeve or socket sections 2 and 3 sized to receive pipe plain end portions, such as end portions 4 and 5 in substantially confronting or end-to-end abutment. The sleeve sections 2 and 3 have respective locking rods 6 extending tangentially through walls 7 thereof for engagement with the pipe plain end portions 4 and 5 and firmly locking the pipe sections to the fitting 1.

The fitting 1 includes means for effecting a secure supporting grip and leak-free seal with at least one pipe end. In the illustrated example, FIG. 1, the fitting 1 is in the form of an end-to-end couple for connecting confronting pipes although it is within the scope of this invention to employ the inventive concept with other conduit fitting forms such as Tees, caps, angles, and the like. The fitting 1 is particularly useful in fire fighting sprinkler systems wherein a great number of relatively short lengths of pipe are utilized.

The pipe end portions 4 and 5 are plain end; that is, the end is of the same diameter as the body of the pipe and has no threads, lugs, grooves or other special connecting arrangements formed thereon prior to connection. Therefore, a pipe can be merely cut to a desired length and the fitting 1 rapidly installed on the end thereof, thereby facilitating fast job completion and reduced labor costs compared to threaded couples and other complex connecting arrangements.

The fitting 1 and the pipe to be connected thereto are preferably constructed of steel, cast iron or the like suitable material, the pipe normally being manufactured in industry standard diameters. The sleeve sections 2 and 3 are appropriately sized to receive the pipe ends. For example, drawn steel pipe commonly used in fire sprinkler installations is manufactured in one-inch and one and one-half inch outside diameters and have a wall thickness of from about 0.085 to 0.145 inch. In the illustrated example, the cylindrical sleeve sections 2 and 3 each have an inside diameter sized slightly larger than the outside dimension of the pipe to easily receive the pipe end portions 4 and 5 as described below.

The exemplary sleeve sections 2 and 3 each have a pipe cradling interior surface 10 and an exterior surface 11 with outer ends 12 doubly chamfered to reduce edge chipping and promote ease of pipe end insertion. The fitting 1 has a central ridge portion 14 at a longitudinal mid-point thereof which has respective outwardly facing annular shoulders 15 providing an abutment surface for a pipe end edge 16 to limit intrusion of the respective pipe end portions 4 and 5. A large annular housing 18 positioned intermediately of the outer end 12 and the central ridge portion 14 in each of the sleeve sections 2 and 3 provides a recess accommodating an annular seal 19 of suitable elastomeric material such as Buna (S) rubber, Buna (N) rubber, natural rubber or well-known flexible synthetics such as polyurethane, Hypalon or Viton, the latter two being Du Pont Corporation (Wilmington, Delaware) trademarks respectively for chlorosulfonated polyethylene and polyvinylidiene-hexchloropropylene. The exemplary seals 19 each have spaced, radially inner beads 20 extending away from the central ridge portion 14 of the fitting 1 for interferably engaging an outside surface 21 of the pipe end portions 4 and 5 with a compressive force and forming a fluid-tight connection between the respective pipe end portions 4 and 5 and the fitting 1.

The sleeve members 2 and 3 each includes a longitudinally advanceable, rotatable locking rod 6. In the illustrated examples, FIGS. 2 and 3, the locking rods 6 are engaged within a bore 22 extending substantially tangentially through the wall 7 and communicating with the interior surface 10 over less than a cross-sectional circular periphery of the bore 22, FIG. 1, whereupon a segment of the wall of the bore 22 forms an intersection 25 with the interior surface 10 along the length of the bore 22. It is within the concept of this invention that the locking rods 6 could be positioned to advance at one of several selected such tangential angles relative to the longitudinal axis of the respective pipe end portions 4 and 5 so long as the locking rod 6, when fully extended into the respective sleeve sections 2 and 3, does not completely cut through the pipe end wall 23 and communicate with an inside surface 24 of the pipe. The wall 7, in this example, has an outwardly extending tapered shoulder portion 26 surrounding the bore 22 and terminating in a planar end surface 27. Formed inside the bore 22 and generally adjacent the shoulder portion 26 are a plurality of screw threads 28 for a purpose later described.

Figure 2:
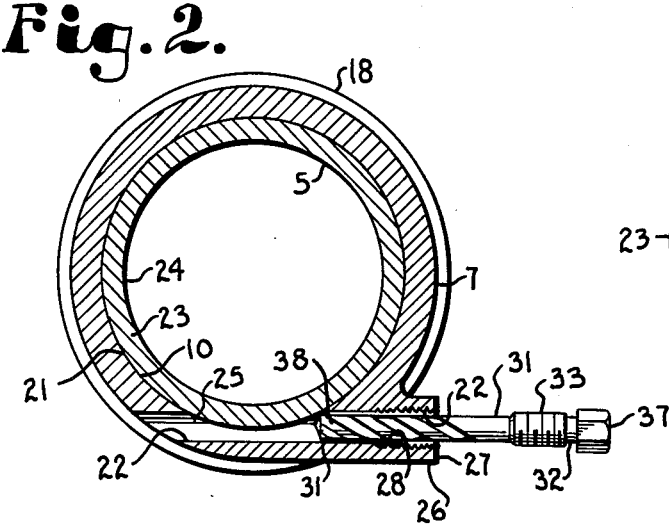
FIG. 2 is a transverse sectional view of the fitting for coupling pipes and showing a locking rod in a ready-to-use position.
Figure 3:
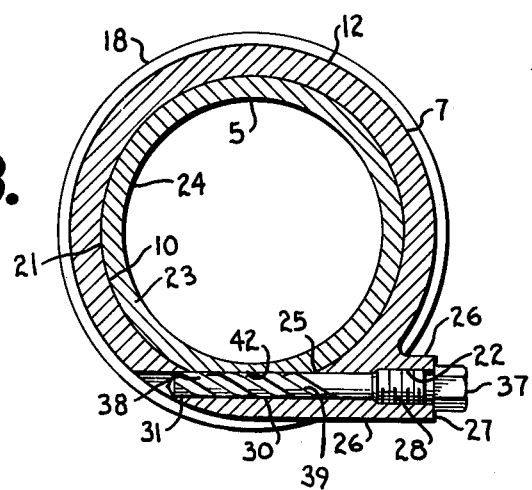
FIG. 3 is a transverse sectional view of the fitting for coupling pipes showing the locking rod thereof fully advanced into the fitting and locking a pipe end portion thereto.

As shown in FIGS. 2 and 3, each locking rod 6 includes a shaft 30 having a cutting tip 31 and an opposite head end 32 with threads 33 formed generally adjacent the head end 32 and engageable with threads 28 in the shoulder portion 26 of the bore 22 for retaining the locking rod 6 in the bore 22 when in an extended or locking position. Alternatively, the threads 33 could extend a sufficient distance on the shaft 30 (not shown) to engage the threads 28 in the bore 22 when in the ready-to-use position, FIG. 2, and thereby facilitate spiral advancement of the locking rod 6. The head end 32 includes an appropriate member facilitating rotation of the shaft 30, such as an enlarged hexagonal head 37 adapted for engagement with a wrench (not shown). As discussed below, in the ready-to-use position, the enlarged head 37 is spaced from the shoulder planar end surface 27 whereby the locking rod 6 advances into a locking position such that the enlarged head 37 engages the planar end surface 27 and prevents further advancement of the locking rod 6.

The cutting tip 31 is adapted for tangentially cutting into the pipe end wall 23, and has cutting means such as an end mill, twist drill or the like and in the illustrated example, is in the form of a twist drill with a plurality of flutes 38 and cutting edges 39 thereon formed of a suitable material. The exemplary cutting edges 39 are generally in the form of a portion of a spiral or helix around the longitudinal axis of the shaft 30 and extend a short distance rearwardly from the cutting tip 31 toward the head end 32, terminating prior to reaching the threads 33. The cutting edges 39 on the cutting tip 31 have nose and side angles, such as of conventional configuration, relative to the pipe end portion 2 or 3 for boring a tangential groove 42 along the intersection 25 through the outside surface 21 of the pipe and into the pipe end wall 23. After cutting operations, the locking rod 6 fills the groove 42 and remains in an extended or locked position so that the shaft 30 acts as a key to firmly lock the pipe end into the fitting 1.

Connecting the fitting 1 to pipe end portions 4 and 5 is extremely fast and simple and requires only appropriate local cleaning and deburring of the pipe, inserting the pipe end portions 4 and 5 into respective sleeve or socket sections 2 and 3 until the pipe end edges 16 seat against the annular shoulders 15 and spirally advancing the respective locking rod 6 into the bore 22 until the enlarged head 37 seats against the planar end surface 27.

Using a manual wrench, air operated wrench or the like (not shown), the workman advances the locking rod 6 until the cutting tip 31 firmly engages the pipe outside surface 21. The workman continues to advance the locking rod 6 until the head 37 seats against the shoulder end surface 27 and the shaft 30 is keyed within a channel 42 formed as the locking rod 6 advances. As the cutting tip 31 moves forwardly, the nose and side cutting edges 39 cuttingly penetrate and carve through the outside surface 21 and into the pipe wall 23, removing metal material and forming chips which are pushed forwardly as the cutting tip 31 advances in the bore 22. The metal material and chips are removed from the pipe end wall 23 without inward bulging or deformation of the inside surface 24 of the pipe so as to form the tangential groove 42 which thus receives the shaft 30.

Figure 4:
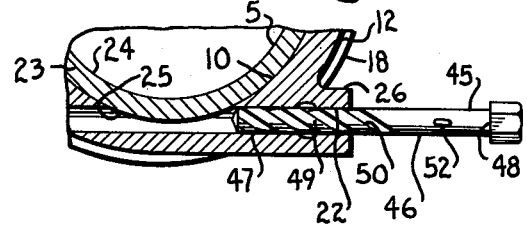
FIG. 4 is a fragmentary, transverse sectional view of the fitting for coupling pipes showing an alternately embodied locking rod in a ready-to-use position.

In the alternate embodiment shown in FIG. 4, the bore 22 has no threads therein but instead is a smooth bore. The alternately embodied locking rod 45 has a shaft 46 with an edged cutting tip 47 and enlarged head end 48 without threads as shown in connection with FIGS. 2 and 3. In the illustrated alternate example, the locking rod 45 is substantially in the form of a twist drill and has a spiral configuration of flutes 49 and cutting edges 50 extending substantially the length of the shaft 46 and terminating near the head end 48. When fully advanced into the bore 22, the locking rod 45 is generally firmly keyed therein; however, to further protect against inadvertent disengagement, the shaft 46 is provided with an outward extending lug 52 such as of Nylon or the like, adjacent the head end 48 which wedges into the bore 22 within the shoulder portion 26 as the head end 48 enters therein.

It is to be understood that while certain forms of this invention have been illustrated and described, it is not to be limited to the specific forms or arrangements of parts herein described and shown, except insofar as such limitations are included in the following claims.

What I claim and desire to secure by Letters Patent is:
1. A pipe fitting comprising:
   (a) a body having a wall defining a pipe end receiving socket with a pipe cradling interior surface;
   (b) a bore extending substantially tangentially through said wall and communicating with said interior surface over less than a cross-sectional circular periphery of said bore whereupon a segment of the wall of said bore forms an intersection with said interior surface along the length of said bore; and
   (c) a rotatable, cylindrical locking rod received in said bore and having a material removing, cutting tip for tangentially cutting a smooth-bored, continuous groove along said intersection in a pipe received in said socket and filling said groove to prevent removal of said pipe, said locking rod having engagement means thereon cooperating with said bore to retain said locking rod received in said bore.

2. The pipe fitting set forth in claim 1 wherein:
(a) said locking rod has a shaft portion and a head end; and
(b) said shaft portion has said engagement means near said head end for engagement in said bore to retain said locking rod received in said bore.

3. The pipe fitting set forth in claim 2 wherein:
(a) said bore has a plurality of threads therein; and
(b) said shaft portion has a plurality of threads thereon for engagement with the threads in said bore.

4. The pipe fitting set forth in claim 2 wherein:
(a) said bore is a smooth bore; and
(b) said shaft portion has a lug extended outwardly thereof for engagement with said smooth bore.

5. The pipe fitting set forth in claim 2 wherein:
(a) said head end is enlarged outward of said shaft portion and has multiple faces for grasping and effecting rotation; and
(b) said socket has a shoulder substantially surrounding said bore with an end surface positioned to engage said head end and limit advancement of said locking rod.

6. The pipe fitting set forth in claim 2 including:
(a) a resilient annular seal in said socket for engaging the pipe and effecting a fluid-tight connection between the pipe and socket.

7. The pipe fitting set forth in claim 6 including:
(a) an abutment member extending radially inwardly toward a longitudinal centerline of said socket and limiting intrusion of said pipe into said socket.

8. The pipe fitting set forth in claim 7 including:
(a) a second said socket for receipt of a second pipe; and wherein
(b) said abutment member separates said socket from the second said socket.

9. A pipe fitting comprising:
(a) a wall defining a metal pipe end receiving socket with a pipe cradling interior surface;
(b) a threaded bore extending substantially through said wall and having a longitudinal axis directed tangentially and communicating with said interior surface over less than a cross-sectional periphery of said bore whereupon a segment of the wall of said bore forms an intersection with said interior surface along the length of said bore;
(c) a locking device comprising a cylindrical rod having a head at one end and a cutter portion at the other end, said rod having a threaded portion engaged in said threaded bore;
(d) said head being adapted for rotating said shaft body and spirally advancing said locking device toward said interior surface;
(e) said cutter portion having flutes and a material removing, metal cutting edge;
(f) said cutting edge havig an angle configuration for tangentially cutting a smooth-bored, continuous groove along said intersection and in an outer wall of a pipe end inserted in said socket with said rod filling and remaining in said groove as a key, firmly locking the pipe end in said fitting.

* * * * *